United States Patent
Krogdahl

(10) Patent No.: US 9,144,938 B2
(45) Date of Patent: Sep. 29, 2015

(54) METHODS FOR ATTACHING STRUCTURES USING ULTRAVIOLET AND VISIBLE LIGHT CURING ADHESIVE

(75) Inventor: James R. Krogdahl, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 562 days.

(21) Appl. No.: 13/567,949

(22) Filed: Aug. 6, 2012

(65) Prior Publication Data

US 2014/0036353 A1 Feb. 6, 2014

(51) Int. Cl.
| | | |
|---|---|---|
| G06K 7/10 | (2006.01) | |
| B29C 65/14 | (2006.01) | |
| B29C 65/48 | (2006.01) | |
| B29C 65/00 | (2006.01) | |
| B29C 45/16 | (2006.01) | |
| B29L 31/00 | (2006.01) | |
| B29C 45/00 | (2006.01) | |

(52) U.S. Cl.
CPC ......... B29C 65/1406 (2013.01); B29C 45/1657 (2013.01); B29C 65/149 (2013.01); B29C 65/1409 (2013.01); B29C 65/1435 (2013.01); B29C 65/4845 (2013.01); B29C 66/1122 (2013.01); B29C 66/472 (2013.01); B29C 66/474 (2013.01); B29C 45/0001 (2013.01); B29C 65/1441 (2013.01); B29C 65/1496 (2013.01); B29C 2045/1664 (2013.01); B29K 2995/0025 (2013.01); B29K 2995/0027 (2013.01); B29L 2031/764 (2013.01); Y10T 428/24008 (2015.01)

(58) Field of Classification Search
None
See application file for complete search history.

(56) References Cited

U.S. PATENT DOCUMENTS

| | | |
|---|---|---|
| 8,205,327 B2 | 6/2012 | Miyakawa et al. |
| 2002/0134489 A1* | 9/2002 | Sweeney et al. ............... 156/108 |
| 2006/0137901 A1 | 6/2006 | Yu et al. |
| 2008/0230177 A1 | 9/2008 | Crouser et al. |
| 2010/0026659 A1 | 2/2010 | Long et al. |
| 2010/0134439 A1 | 6/2010 | Ito et al. |

(Continued)

FOREIGN PATENT DOCUMENTS

WO 0191193 11/2011

OTHER PUBLICATIONS

Huang et al., U.S. Appl. No. 13/329,010, filed Dec. 16, 2011.

(Continued)

*Primary Examiner* — Arnel C Lavarias
(74) *Attorney, Agent, or Firm* — Treyz Law Group; G. Victor Treyz; Michael H. Lyons

(57) ABSTRACT

An electronic device may be provided with electronic device structures such as housing structures and structures associated with electrical components. The electronic device structures may be attached to each other using ultraviolet and visible light curable adhesive. A layer of adhesive may be interposed between electronic device structures. A light source may generate ultraviolet light. The structures may include an ultraviolet-light-transparent structure through which the ultraviolet light passes to illuminate and cure the adhesive. The ultraviolet-light-transparent structure may form one of multiple shots of injection molded plastic in a device structure, may be formed using a plastic that is opaque at visible wavelengths, or may have a coating such as a metal coating to help reflect ultraviolet radiation onto the adhesive. Perforations in the coating may be used to pass ultraviolet radiation to the adhesive.

22 Claims, 19 Drawing Sheets

(56) References Cited

U.S. PATENT DOCUMENTS

| | | |
|---|---|---|
| 2011/0012845 A1 | 1/2011 | Rothkopf et al. |
| 2011/0292623 A1 | 12/2011 | Stanley |
| 2012/0050958 A1 | 3/2012 | Sanford et al. |
| 2012/0206376 A1 | 8/2012 | Lin |
| 2012/0241185 A1 | 9/2012 | Hsu et al. |

OTHER PUBLICATIONS

Glaser, "Colorants and Special Additives for Laser Welding," Joining Plastics 2006, Apr. 25-26, 2006 (5 pages).

* cited by examiner

METHODS FOR ATTACHING STRUCTURES USING ULTRAVIOLET AND VISIBLE LIGHT CURING ADHESIVE

BACKGROUND

This relates generally to adhesives and, more particularly, to curing adhesives using ultraviolet and visible light.

Adhesives are widely used to attach structures to each other. As an example, electronic devices such as computers and cellular telephones often contain adhesives for mounting components to housing structures, for attaching housing structures to each other, and for otherwise assembling structures within a completed device.

Thermally cured adhesives can be difficult to control and involve the use of elevated temperatures. The use of elevated temperatures may not be desirable, because many devices include sensitive components with relatively low temperature tolerances. In contrast, ultraviolet and visible (UV/Vis) light curing adhesives can be cured immediately upon application of UV/Vis radiation at room temperature. The ease of controlling the curing process and the relatively low temperatures involved in curing make UV/Vis radiation curing adhesives satisfactory in a wide range of applications.

It can be challenging, however, to use UV/Vis radiation curing adhesives in assemblies that contain opaque structures. If care is not taken, the opaque nature of a structure may cause the structure to block UV/Vis radiation from reaching the adhesive during the curing process. If too much UV/Vis radiation is blocked, the adhesive may be poorly cured.

It would therefore be desirable to be able to provide improved electronic device structures to facilitate the use of UV/Vis radiation curing adhesives.

SUMMARY

An electronic device may be provided with structures such as housing structures and electronic device structures associated with electrical components. Electronic device structures such as these may be attached to each other using ultraviolet and visible light curing adhesive. Ultraviolet (UV) and visible (Vis) light curing adhesives may sometimes be referred to herein as UV/Vis light curing adhesive, UV/Vis radiation curing adhesives, ultraviolet and visible light curable adhesives, UV/Vis curable adhesives, or UV/Vis adhesives.

A layer of adhesive may be interposed between respective electronic device structures. A light source such as a laser, light-emitting diode, or lamp may generate ultraviolet light for curing the adhesive.

The structures may include an ultraviolet-light-transparent structure through which the ultraviolet light passes to illuminate and cure the adhesive. The UV-transparent structure may be formed from one of multiple shots of injection molded plastic in a device structure. For example, the UV-transparent structure may be formed from a first shot of plastic that is transparent to ultraviolet light, whereas a second shot of plastic in the device structure may be formed from a plastic material that is opaque at visible wavelengths.

The UV-transparent structure may be partly covered with a coating such as a metal coating to help reflect light onto the adhesive. Metal coatings may also be formed on other structures that are adjacent to the adhesive to enhance light reflections into the adhesive. Perforations in a coating may be used to help pass UV and/or Vis light to the adhesive.

Further features, their nature and various advantages will be more apparent from the accompanying drawings and the following detailed description of the preferred embodiments.

DETAILED DESCRIPTION

It is often desirable to use ultraviolet and visible radiation curing adhesives when assembling structures formed from materials such as plastic, glass, ceramic, metal, and other materials. These type of UV/Vis adhesives may be provided with additives that enhance their sensitivity to electromagnetic radiation (light) at desired wavelengths. For example, UV/Vis adhesives may be formulated that cure upon exposure to ultraviolet and visible light. These UV/Vis adhesives may be cured using light having a wavelength in the range form 100 nm to 700 nm.

UV/Vis adhesives may be used to join structures in any suitable equipment. Arrangements in which UV/Vis adhesives are used in assembling parts in an electronic device are sometimes described as an example. This is, however, merely illustrative. Any suitable structures may be attached to one another using UV/Vis adhesives, if desired.

Figure 1:
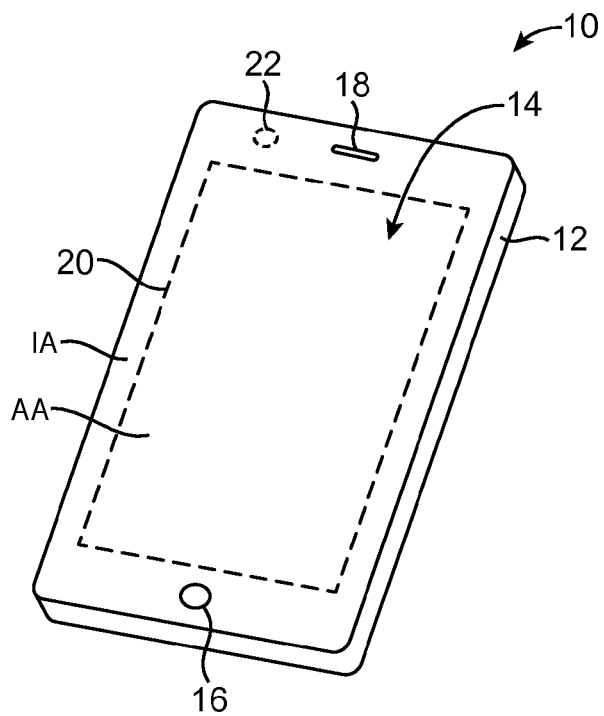
FIG. 1 is a front perspective view of an illustrative electronic device of the type that may contain structures that are attached to each other with UV/Vis adhesive in accordance with an embodiment.

An illustrative device of the type that may include electronic device structures joined using UV/Vis adhesives is shown in FIG. 1. Electronic device 10 may be a computer such as a computer that is integrated into a display such as a computer monitor, a laptop computer, a tablet computer, a somewhat smaller portable device such as a wrist-watch device, pendant device, or other wearable or miniature device, a handheld device such as a cellular telephone, a media player, a tablet computer, a gaming device, a navigation device, a computer monitor, a television, or other electronic equipment.

As shown in FIG. 1, device 10 may include a display such as display 14. Display 14 may be a touch screen that incorporates a layer of conductive capacitive touch sensor electrodes or other touch sensor components or may be a display that is not touch-sensitive. Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies. Configurations in which display 14 includes display layers that form liquid crystal display (LCD) pixels may sometimes be described herein as an example. This is, however, merely illustrative. Display 14 may include display pixels formed using any suitable type of display technology.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18.

Peripheral portions of display 14 may be provided with an opaque masking layer. As shown in FIG. 1, display 14 may be characterized by a central active region such as active region AA in which an array of display pixels is used in displaying information for a user. Active region AA may be surrounded by an inactive region such as inactive border region IA. Active region AA may have a rectangular shape bordered by rectangular line 20. Inactive region IA may have a rectangular ring shape that surrounds active region AA (as an example). The underside of the display cover layer in inactive region IA may be covered with an opaque masking layer such as a layer of black ink (e.g., a polymer filled with carbon black). The opaque masking layer may help hide components in the interior of device 10 in inactive region IA from view by a user.

If desired, one or more openings may be formed in the opaque masking layer. For example, an opening may be formed in region 22 to form a window for a front-facing camera. Openings may also be formed to accommodate ambient light sensors and other devices.

Device 10 may have a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.). The periphery of housing 12 may, if desired, include walls. For example, housing 12 may have a peripheral conductive member such as a metal housing sidewall member that runs around some or all of the periphery of device 10 or may have a display bezel that surrounds display 14. Housing 12 may have sidewalls that are curved, sidewalls that are planar, sidewalls that have a combination of curved and flat sections, and sidewalls of other suitable shapes. One or more openings may be formed in housing 12 to accommodate connector ports, buttons, and other components.

Figure 2:
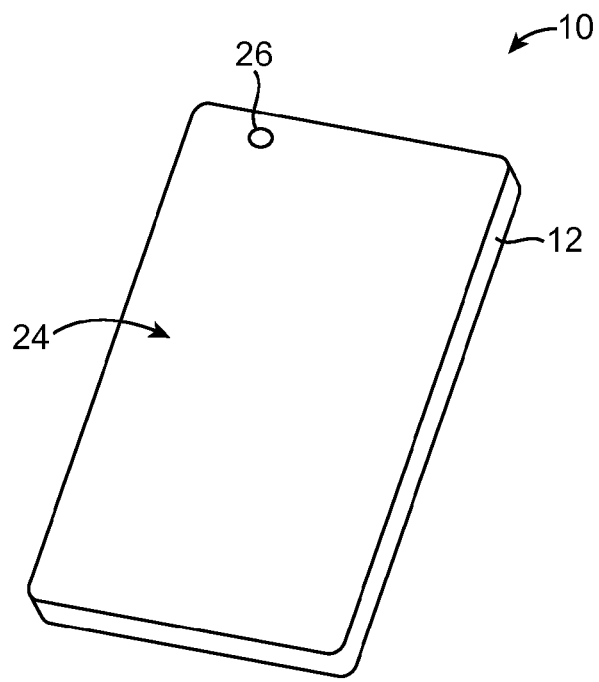
FIG. 2 is a rear perspective view of the electronic device of FIG. 1 in accordance with an embodiment.

As shown in the front perspective view of FIG. 1, display 14 may be mounted on the front face of device 10. As shown in the rear perspective view of FIG. 2, device 10 may have a rear housing member such as rear planar housing wall 24. Wall 24 may be formed from a planar plastic structure, a planar metal structure, a glass layer, ceramics, or other materials. Openings may be formed in rear wall surface 24 for components such as camera 26. Camera 26 may have a disk-shaped window and associated lenses formed from glass or plastic. A camera window may, for example, be formed from a disk of glass that is mounted in a plastic camera window mounting structure using UV/Vis adhesive. Other structures associated with device 10 may also be assembled using UV/Vis adhesive if desired. For example, adhesive may be used in attaching structures associated with walls for housing 12, structures associated with the display cover layer in display 14, structures associated with internal device components, or other electronic device structures in device 10.

To ensure that light having wavelengths within the UV and/or visible portion of the electromagnetic spectrum (for curing adhesive in device 10) can reach the adhesive, it may be desirable to form some of the structures in device 10 from materials that are transparent. Device aesthetics may often be enhanced by forming external (or even internal) components from materials that are opaque at visible wavelengths. To ensure that ultraviolet radiation for curing a layer of adhesive may pass through a component that is opaque at visible wavelengths, the component may be formed from a material (such as plastic) that has been configured to absorb light at visible wavelengths (e.g., wavelengths in the visible light range of 390 nm to 750 nm or other suitable visible light range) while transmitting light at ultraviolet wavelengths (e.g., at one or more wavelengths below the 390 nm lower edge of the visible light range, such as some or all wavelengths from 250 nm to 390 nm). This type of component may allow ultraviolet radiation (sometimes referred to as ultraviolet light) to pass through the component to cure adhesive, while exhibiting sufficient opacity at visible wavelengths to appear opaque to a user of device 10 or other viewer of the component.

Figure 3:
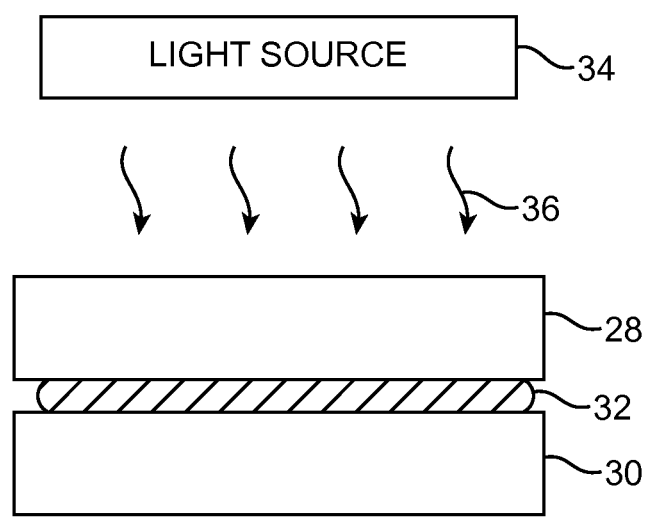
FIG. 3 is a side view of a system in which structures are being attached to each other with UV/Vis adhesive by using radiation from a light source that passes through one of the structures in accordance with an embodiment.

Consider, as an example, the scenario of FIG. 3. In the FIG. 3 example, two structures (structures 28 and 30) are being attached to each other using UV/Vis adhesive 32.

Structures 28 and 30 may be portions of device 10 of FIG. 1 (as an example). For example, structures 28 and 30 may be external or internal housing structures, electrical components, components for forming optical windows, structures for mounting devices such as camera mounting structures or camera window mounting structures, structures associated with buttons and other input devices, a display cover layer, portions of housing 12, etc. Structure 30 may be formed from plastic, metal, glass, ceramic, other materials, or combinations of these materials. Structure 28 may be formed from a material that has been configured to exhibit transmission in ultraviolet wavelengths and absorption in visible wavelengths.

As shown in FIG. 3, a light source such as light source 34 may be used to generate ultraviolet light 36. UV light 36 may, for example, be light with a wavelength of between 100 and 390 nm, light with a wavelength of 365 nm, or other suitable ultraviolet light. UV light 36 may include some light having visible light wavelengths.

Structure 28 may be configured to exhibit light absorption at visible wavelengths, so that structure 28 appears opaque to the user of device 10. Structure 28 may simultaneously be configured to exhibit a low absorption (high transmission) at ultraviolet wavelengths. Structure 28 may, for example, be formed from a polymer with an additive that creates absorption of more than 70% (and therefore transmission at less than 30%) for some or all visible wavelengths (e.g., all wavelengths from 390 to 750 nm, or all wavelengths from 450 to 750 nm) while simultaneously exhibiting a transmission of greater than 70% (and therefore an absorption of less than 30%) at ultraviolet wavelengths of interest (e.g., all wavelengths from 250 nm to 390 nm, all wavelengths from 250 nm to 450 nm, all wavelengths in a 30 nm band or 10 nm band centered on an ultraviolet light curing wavelength of interest such as 365 nm or 385 nm, etc.).

When ultraviolet light 36 from light source 34 are applied to structure 28, however, the relatively high transmission of structure 28 at ultraviolet wavelengths will allow the UV light 36 to pass through structure 28. When some or all of UV light 36 reaches internal adhesive layer 32, that UV light 36 can cure adhesive 32, thereby bonding structures 28 and 30 together. If desired, both structures 28 and 30 may be formed from a plastic (or other material) that is opaque at visible wavelengths and transparent at ultraviolet wavelengths. Adhesive 32 may also be used in joining together three or more different structures. Configurations in which two opposing device structures are being joined by adhesive 32 are described herein as an example.

Figure 4:
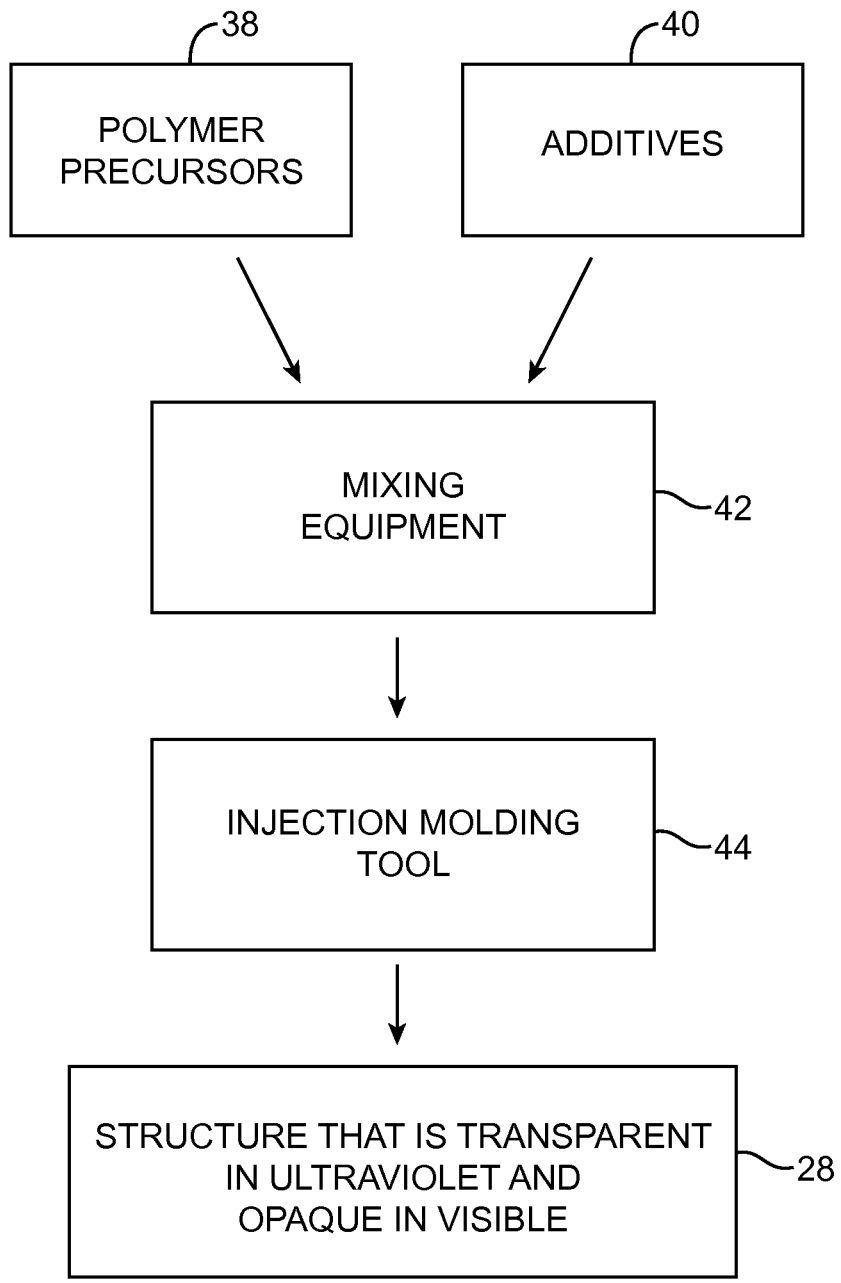
FIG. 4 is a diagram of equipment for forming plastic structures with desired electromagnetic radiation transmission characteristics in accordance with an embodiment.

Illustrative equipment for forming structures for an electronic device such as the structures of FIG. 3 is shown in FIG. 4.

As shown in FIG. 4, equipment such as mixing equipment 42 may be used to combine polymeric materials such as materials 38 with additives 40. Materials 38 may be liquid polymer precursor materials and/or solid polymers. Additives 40 may be combined with materials 38 using mixing equipment 42 to produce polymer beads or other polymeric material suitable for injection molding (as an example).

Injection molding operations with injection molding equipment 44 or other polymer processing operations may be used to form structures such as structure 28 that are transparent at one or more ultraviolet light wavelengths (e.g., wavelengths suitable for curing adhesive 32 of FIG. 3) while being opaque at visible wavelengths. Ultraviolet-light-transparent materials may have a transmission of 50% or more, 70% or more, 80% or more, 90% or more, or 95% or more at ultraviolet light wavelengths of interest (as examples). Visible-light-absorbing materials (opaque materials) may have a transmission of 50% or less, 30% or less, 20% or less, 10% or less, or 5% or less at visible wavelengths (e.g., wavelengths from 390 nm to 750 nm).

Figure 5:
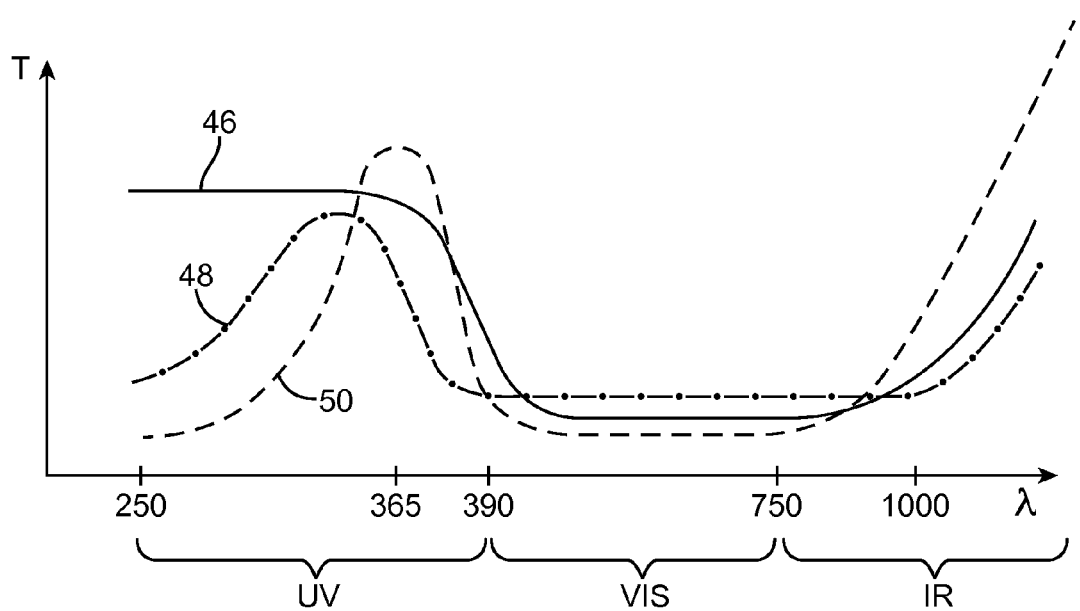
FIG. 5 is a graph showing illustrative transmission curves that may be associated with different types of plastic in accordance with an embodiment.

FIG. 5 is a graph in which illustrative transmission characteristics for structure 28 have been plotted as a function of wavelength $\lambda$. As shown by illustrative curve 50, the polymer material and additives chosen for structure 28 may be configured to exhibit a low transmission in visible light range VIS (i.e., structure 28 may be opaque at visible light wavelengths) while exhibiting high transmission (e.g., transmission of 50% or more, 70% or more, 90% or more, etc.) at wavelengths around 365 nm (e.g., so that light at 365 nm may pass through structure 28 to cure adhesive 32). Curve 48 shows how the transmission peak in the ultraviolet range UV may be centered on other wavelengths of interest if desired. As shown by curve 46, structure 28 may be transparent over a relatively wide range of ultraviolet wavelengths while being opaque at visible wavelengths. Other transmission characteristics may be used for the material of structure 28 if desired. The characteristics represented by curves 46, 48, and 50 of FIG. 5 are merely illustrative.

Figure 6:
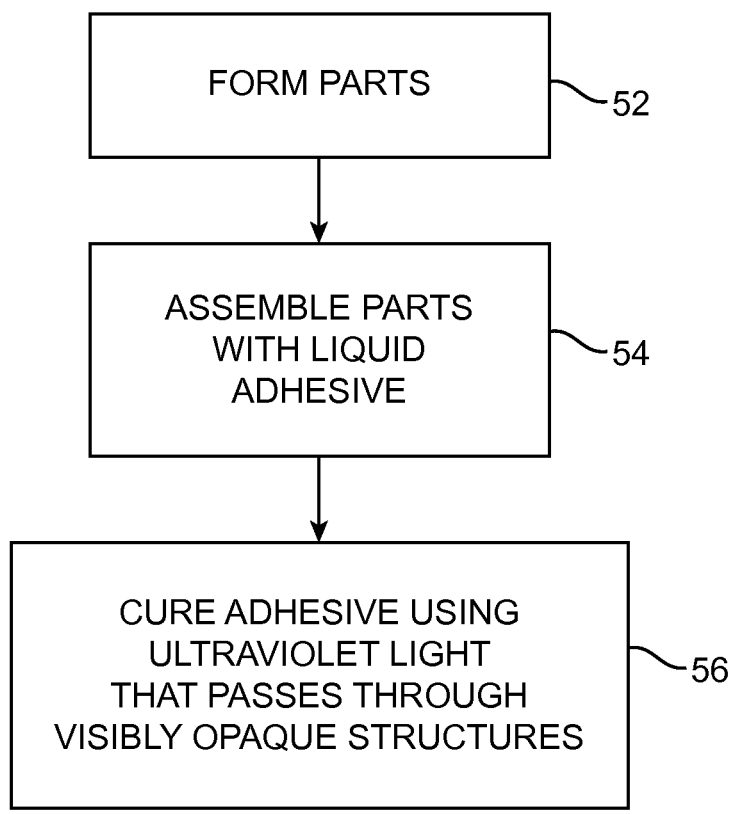
FIG. 6 is a flow chart of illustrative steps involved in curing adhesive using ultraviolet light that passes through plastic parts such as structures that block visible light while transmitting ultraviolet light in accordance with an embodiment.

A flow chart of illustrative steps involved in forming structures such as structure 28 and steps involved in using ultraviolet light that passes through structure 28 to cure adhesive 32 is shown in FIG. 6.

At step 52, structures such as structures 28 and 30 of FIG. 3 may be manufactured. As an example, structure 28 may be formed by combining additives into a polymer to ensure that the polymer has a transmission characteristic of the type shown in FIG. 5 in which visible light is absorbed more than ultraviolet light (e.g., significantly more such as at least two times more, at least ten times more, etc.). Structures in device 10 such as structure 30 may be formed from the same type of material as structure 28 or from different materials (e.g., metal, plastic, glass, ceramic, multiple materials, etc.).

At step 54, the parts that are to be joined may be mounted to each other using UV/Vis adhesive 32 in liquid form (i.e., adhesive that is in its uncured state). Assembly equipment, portions of the structures that are being joints, and/or assembly personnel may hold the structures in place prior to adhesive curing.

At step 56, a light source such as light source 34 of FIG. 3 may be used to apply UV radiation 36 to structure 28. Because structure 28 is transparent to ultraviolet light, UV radiation 36 may pass through structure 28 to illuminate adhesive 32. By curing adhesive 32 in this way, structures 28 and 30 may be bonded to each other.

If desired, injection molding equipment or other processing equipment may be used to form structures that include portions that are transparent to ultraviolet light and portions that are opaque to ultraviolet light. Consider, as an example, a system of the type shown in FIG. 7. Initially, process equipment such as injection molding tool 58 may be used in injection molding a first shot of plastic, thereby forming plastic structure 60. Plastic structure 60 may, for example, form an ultraviolet-light-transparent member (which may be either transparent at visible wavelengths or opaque at visible wavelengths).

Figure 7:
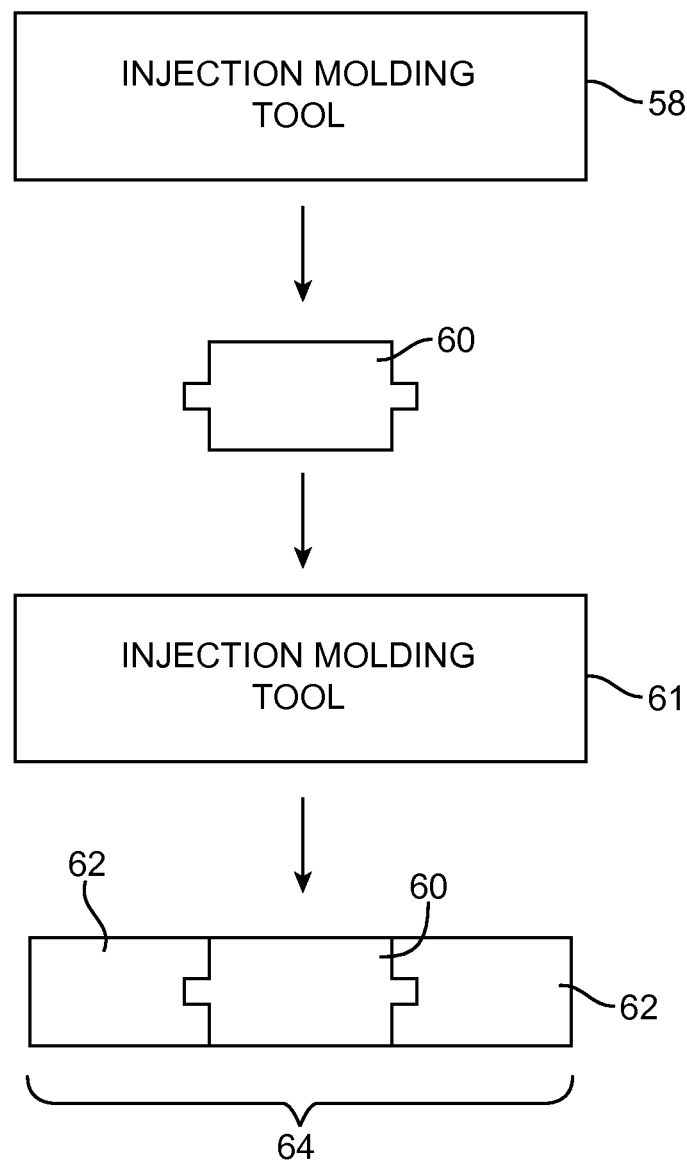
FIG. 7 is a diagram showing how plastic structures that are suitable for assembling with other structures using UV/Vis adhesive may be formed using multiple shots of injection-molded plastic in accordance with an embodiment.

Following formation of the first shot of plastic, injection molding tool 61 (which may be the same equipment as tool 58 of FIG. 7 or which may be formed from different equipment) may be used to injection mold a second shot of plastic onto structure 60. Injection molding tool 61 may, for example, form a second shot of plastic to form plastic structure 62 on plastic structure 60, as shown in FIG. 7. Plastic structure 62 may be formed from a material that need not be transparent to ultraviolet light (and which may be opaque or transparent at visible wavelengths).

Using this type of process, a plastic part such as part 64 of FIG. 7 may be formed that contains at least two different types of plastic. Plastic portion 60 of structure 64 may be transparent to ultraviolet light and plastic portion 62 of structure 64 may be opaque to ultraviolet light.

Figure 8:
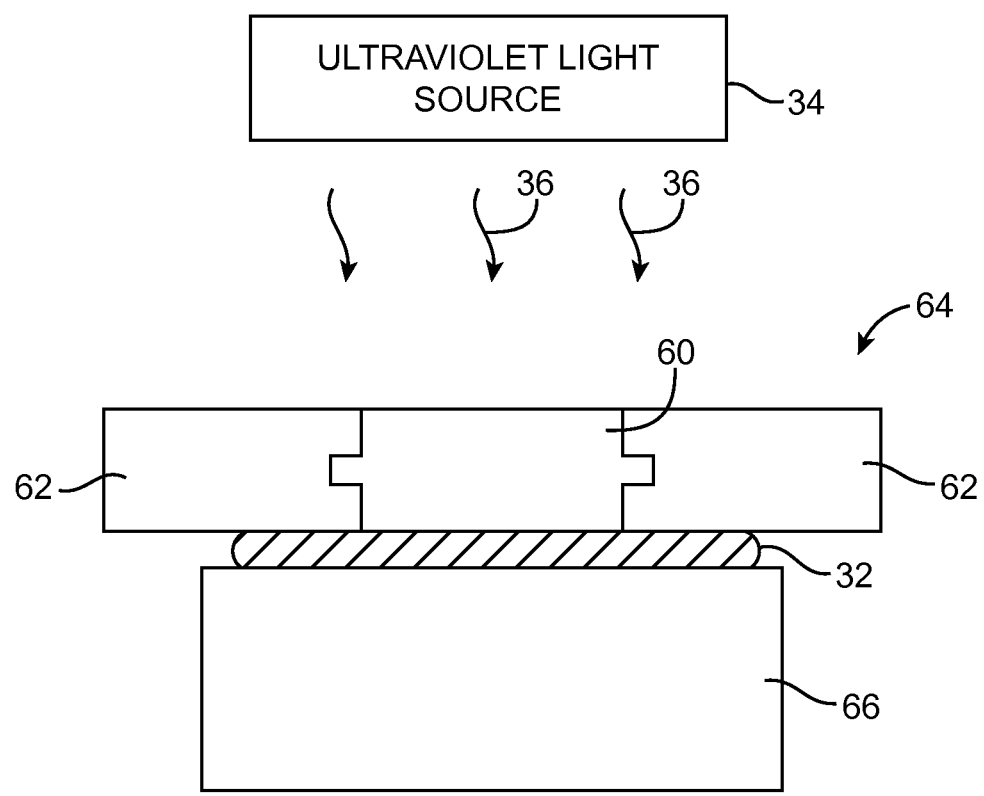
FIG. 8 is a diagram showing how light from an ultraviolet light source may be used to cure adhesive in a scenario in which a part with multiple injection molded shots is being attached to another structure with UV/Vis adhesive in accordance with an embodiment.

Following formation of two-shot structure 64, structure 64 may be attached to other device structures such as structure 66 of FIG. 8 using UV/Vis adhesive 32. Structure 66 may be a housing structure, an electrical component, or and electronic device structure associated with another component in device 10. Structure 66 may be formed from plastic, glass, ceramic, metal, other materials, or combinations of these materials. As shown in FIG. 8, light source 34 (e.g., an ultraviolet light source) may be used to generate UV light 36. Uncured liquid UV/Vis adhesive 32 may be placed between structures 64 and 66. Ultraviolet light 36 may pass through portion 60 of structure 64, thereby illuminating and curing adhesive 32. After sufficient illumination with UV radiation 36, cured adhesive 32 will bond structure 64 to structure 66.

Figure 9:
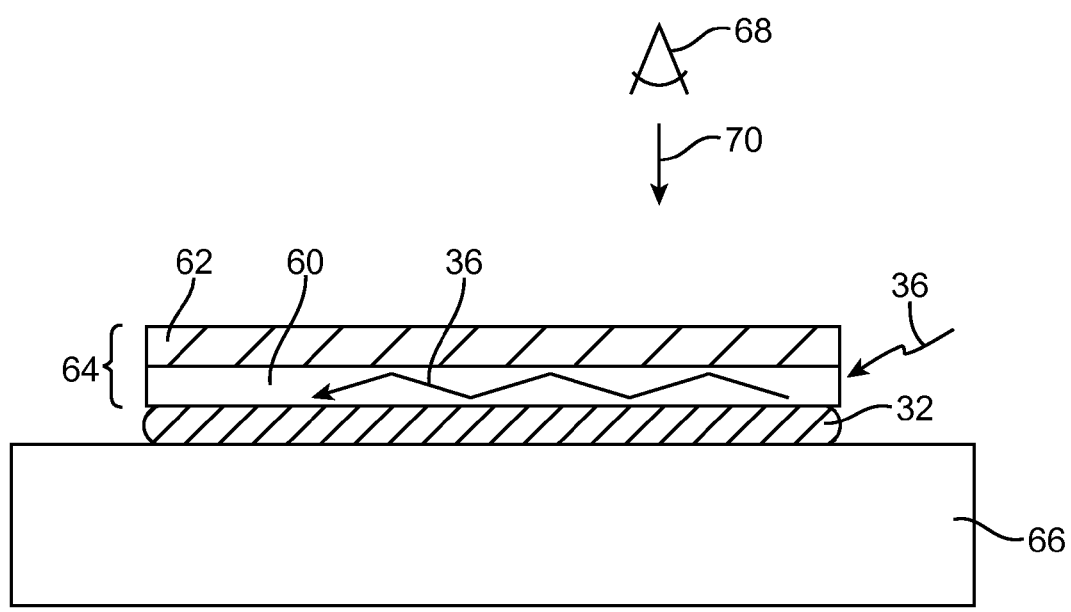
FIG. 9 is a side view of illustrative structures formed from a two-shot injection molding process showing how UV/Vis radiation for curing a layer of adhesive may pass through one shot of plastic in accordance with an embodiment.

As shown in FIG. 9, a two-shot plastic structure such as structure 64 may be formed from thin elongated layers of plastic such as first plastic shot 60 and second plastic shot 62. Plastic structure 60 may be transparent to ultraviolet light so that UV light 36 can enter structure 60 and illuminate adjacent UV/Vis adhesive 32, thereby forming an adhesive bond between structure 64 and structure 66. Plastic structure 62 may be formed from a plastic material that is opaque at ultraviolet light wavelengths and which may also be opaque at visible wavelengths. Structures 60 and 62 may be planar strips or patches of plastic (e.g., layered structures). If desired, structure 62 may be visible to a user of device 10 such as user 68 viewing structure 64 in direction 70.

Figure 10:
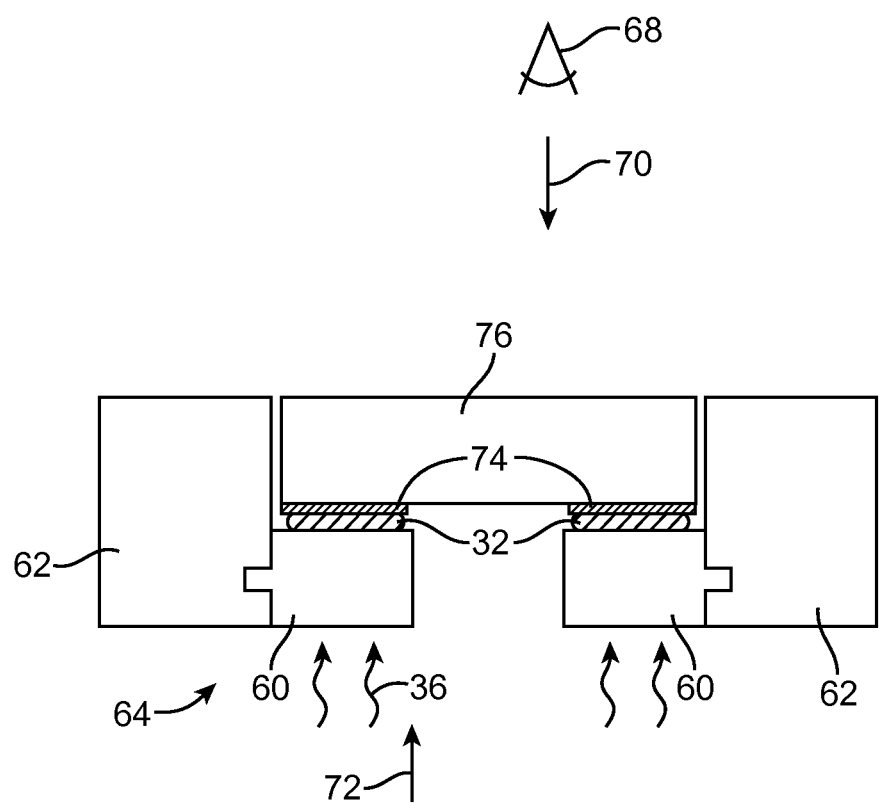
FIG. 10 is a cross-sectional side view of illustrative camera lens mounting structures formed from two shots of plastic in which UV/Vis radiation for curing adhesive passes through one of the shots of plastic in accordance with an embodiment.

Another illustrative configuration that may be used for structures such as structure 64 is shown in FIG. 10. With the arrangement of FIG. 10, structure 64 has been formed from an inner ring (first plastic shot 60) and an outer ring (second plastic shot 62). Plastic portion 60 may be transparent to ultraviolet light 36, so that adhesive 32 may be cured when illuminated by UV radiation 36 traveling in direction 72. Cured adhesive 32 may be used to attach disk-shaped camera window structure 76 to structures 64. Camera window structure 76 may be formed from clear glass or plastic and may be used to form a window for camera 26 of FIG. 2 (as an example). Opaque structures such as opaque layer 74 (e.g., a layer of black ink) may be used to block internal housing structures such as structure 60 from view by user 68 observing structure 60 in direction 70.

Figure 11:
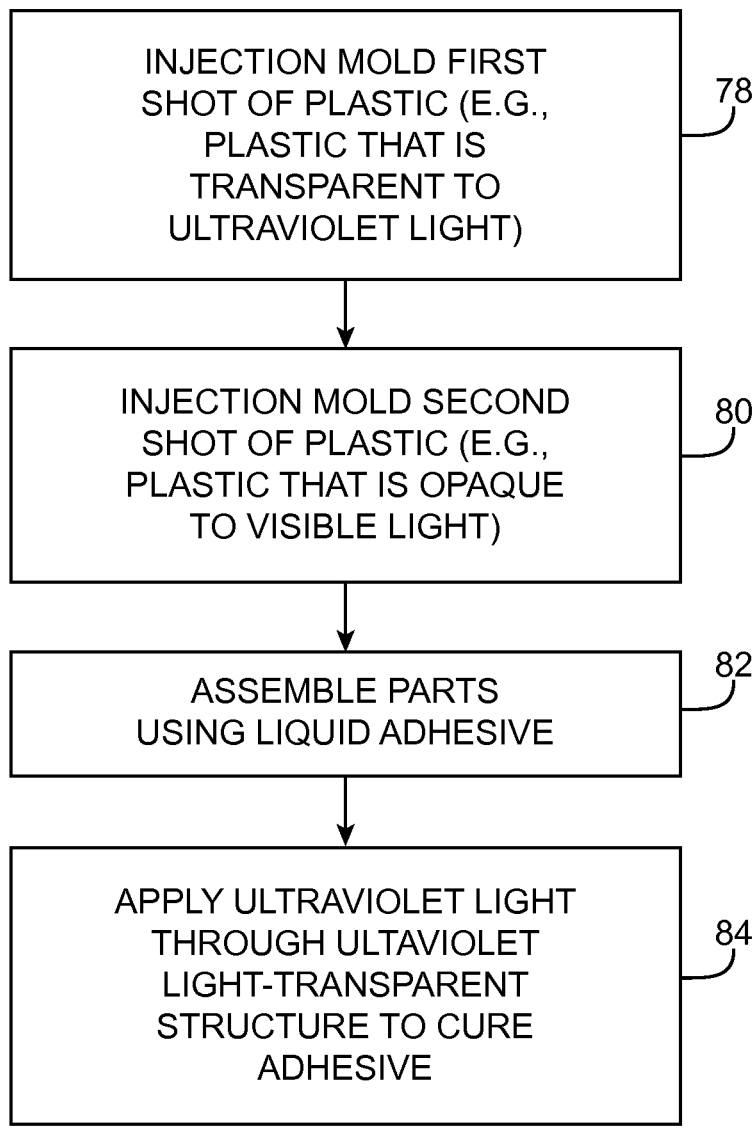
FIG. 11 is a flow chart of illustrative steps involved with forming injection molded parts from multiple shots of plastic including a shot of plastic that transmits ultraviolet radiation for curing adhesive in accordance with an embodiment.

Illustrative steps involved in forming and using multi-shot plastic injection molded members such as structure 64 are shown in FIG. 11.

At step 78, an injection molding tool such as tool 58 of FIG. 7 may use an injection molding process to form a first shot of plastic such as plastic 60. Plastic 60 may be transparent to ultraviolet light.

At step 80, an injection molding tool such as tool 61 of FIG. 7 may be used to form a second shot of plastic such as plastic 62. Plastic 62 may be opaque to ultraviolet light. Structures 60 and 62 may be opaque or transparent to visible light.

Uncured liquid UV/Vis adhesive 32 may be placed between structures to be joined during the operations of step 82. For example, adhesive 32 may form a layer of liquid adhesive between structures 64 and 66, as shown in FIGS. 8, 9, and 10.

During the operations of step 84, light source 34 may produce UV light 36. UV light 36 may be applied to structure 64. UV light 36 that is applied to ultraviolet-light-transparent portion 60 of structure 62 may pass through structure 60 to illuminate and thereby cure adhesive 32.

The process of using UV radiation 36 to cure adhesive 32 may be used in connection with structures that have one or more coating layers. Illustrative systems for forming patterned coating layers on a structure are shown in FIG. 12.

Figure 12:
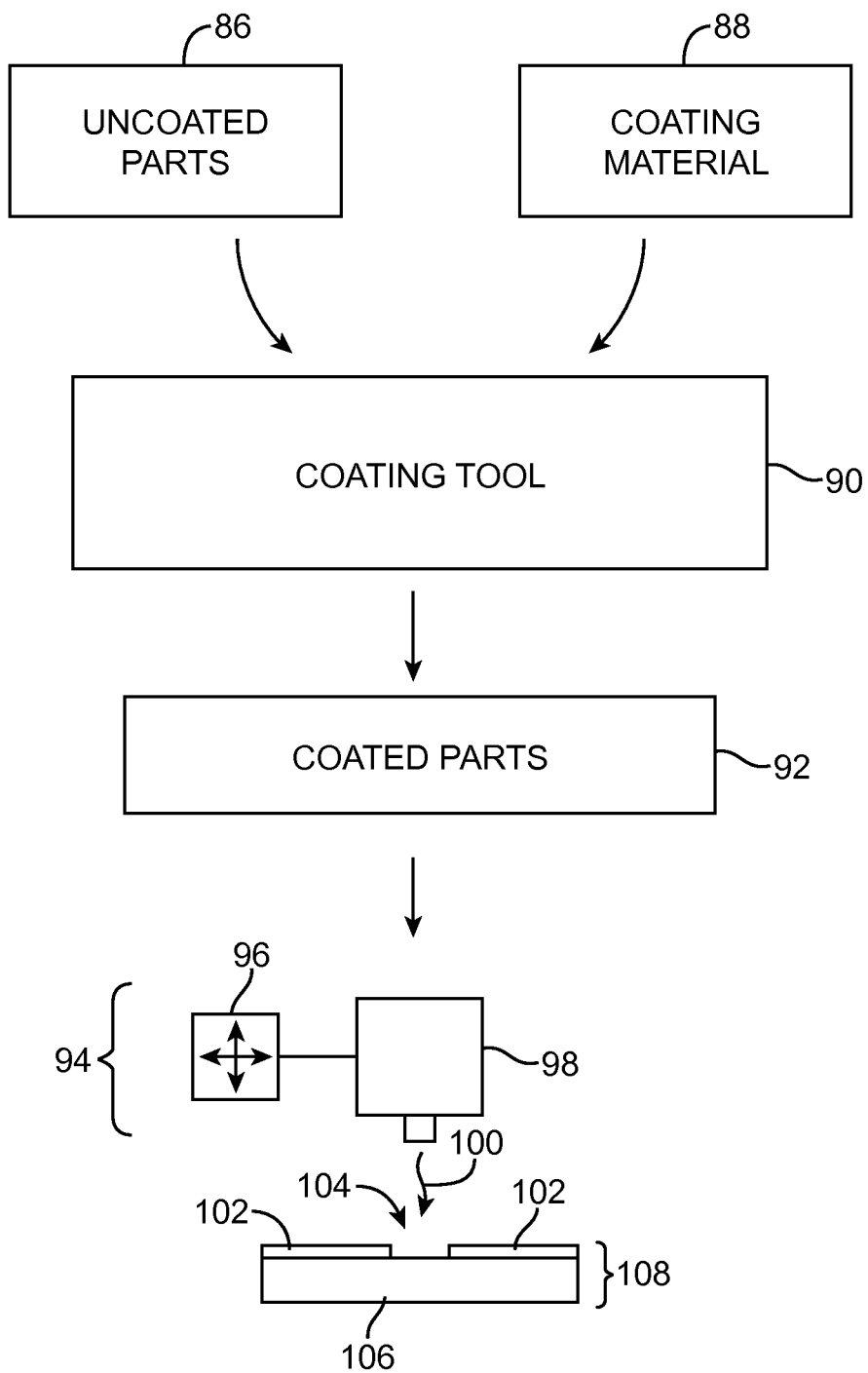
FIG. 12 is a diagram of a system for coating a structure and forming an opening in the coating for facilitating ultraviolet and visible radiation curing of adhesive in accordance with an embodiment.

As shown in FIG. 12, a coating tool such as tool 90 may use coating material 88 to apply one or more coatings to uncoated parts 86. Coating material 88 may be, for example, black ink or other opaque substances. Coatings may be applied using spraying, dipping, physical vapor deposition, chemical vapor deposition, painting, or other suitable fabrication processes. Parts 86 may be formed from materials such as injection molded plastic, glass, ceramic, and other material that are transparent at ultraviolet wavelengths.

Following the formation of coated structures 92 by using tool 90 to apply one or more coatings of material 88 on uncoated structures 86, equipment such as laser-based equipment 94 of FIG. 12 may be used to selectively remove portions of the deposited coatings (in addition to or instead of leaving portions of structures 92 uncoated during the initial deposition process). Equipment 94 may include a computer-controlled positioner such as positioner 96 that controls the position of laser 98. By controlling the position of laser 98 using positioner 96 and by controlling the generation of laser light 100, equipment 94 may create openings such as hole 104 in coating layers such as layer 102 on plastic structure 106, thereby creating structures such as structure 108 that include one or more patterned coatings such as patterned coating 102. The bottom surface of structure 106 may also remain uncoated (e.g., to help illuminate adjacent adhesive). Coatings such as coating 102 may be formed from a material that is opaque at selected visible and/or ultraviolet light wavelengths. Examples of materials that may be used for coating 102 include polymers (e.g., black ink) and metals (e.g., metallic paint coatings such as layers of silver paint or aluminum paint, layers of metal deposited using physical vapor deposition equipment, etc.).

Figure 13:
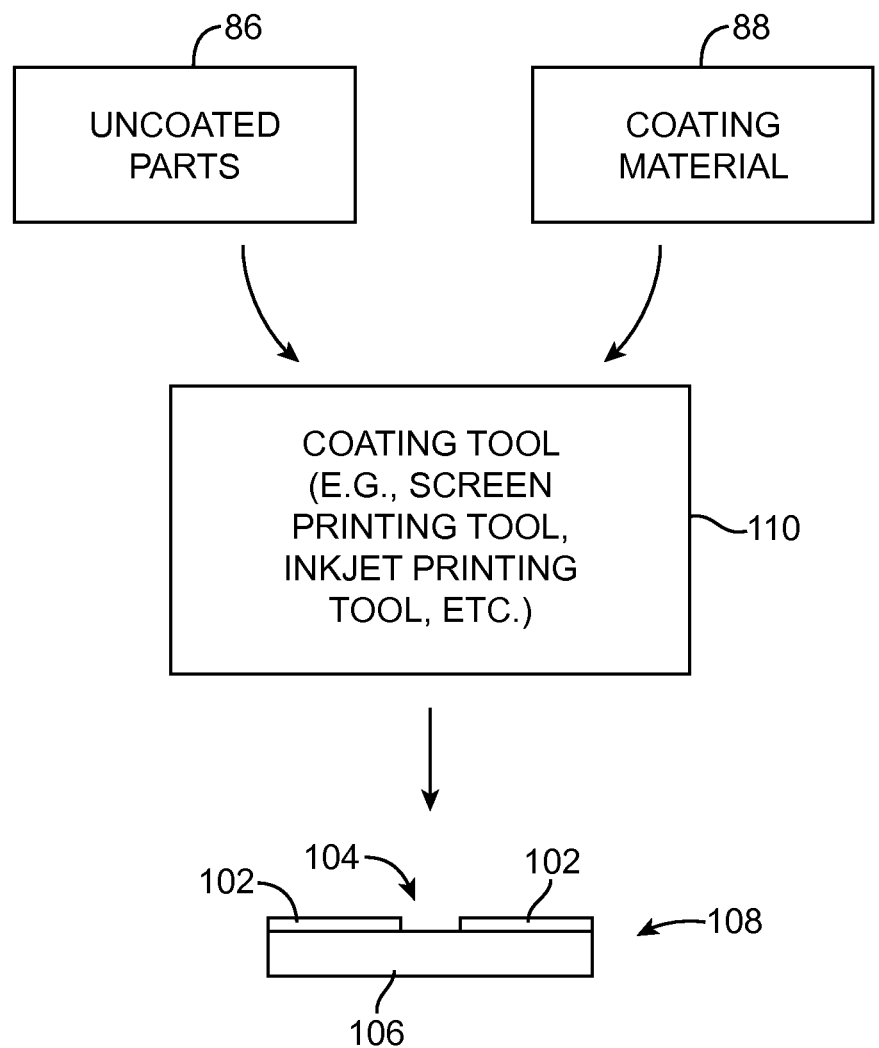
FIG. 13 is a diagram of a system for coating a structure with a patterned coating layer that has openings to receive UV/Vis radiation for UV/Vis adhesive in accordance with an embodiment.

FIG. 13 shows how coatings may be patterned as part of a deposition process. As shown in FIG. 12, coating tool 110 may be provided with coating material 88 and uncoated structure 86 such as plastic structures, glass structures, or other structures that are transparent to ultraviolet light. Coating tool 110 may include equipment for depositing coatings that contain patterned features such as openings (e.g., holes). For example, coating tool 110 may include screen printing equipment, inject printing equipment, pad printing tools, etc. With this type of equipment, coating material 88 may be used to form a patterned coating such as coating 102 with openings such as opening 104 on plastic member 106 of structure 108 (and with an uncoated lower surface in this example). Due to the presence of openings such as opening 104 and the opening associated with the uncoated lower surface of structure 106, structures such as structure 106 of FIG. 13 are generally no more than partly coated with coating material.

The sizes (e.g., the diameters or other lateral dimensions) of openings such as openings 104 of FIGS. 12 and 13 may be less than 10 mm, less than 1 mm, more than 1 mm, less than 0.5 mm, less than 0.1 mm, less than 0.05 mm, etc. Smaller openings (e.g., openings of less than 0.05 mm) are sometimes referred to as microperf and may be invisible to the naked eye of a user. Perforations such as microperf openings may therefore be satisfactory for use on exposed surfaces of device 10 where larger holes could be unsightly. If desired, larger openings may also be used on exposed surfaces or may be used on interior surfaces of device 10.

Figure 14:
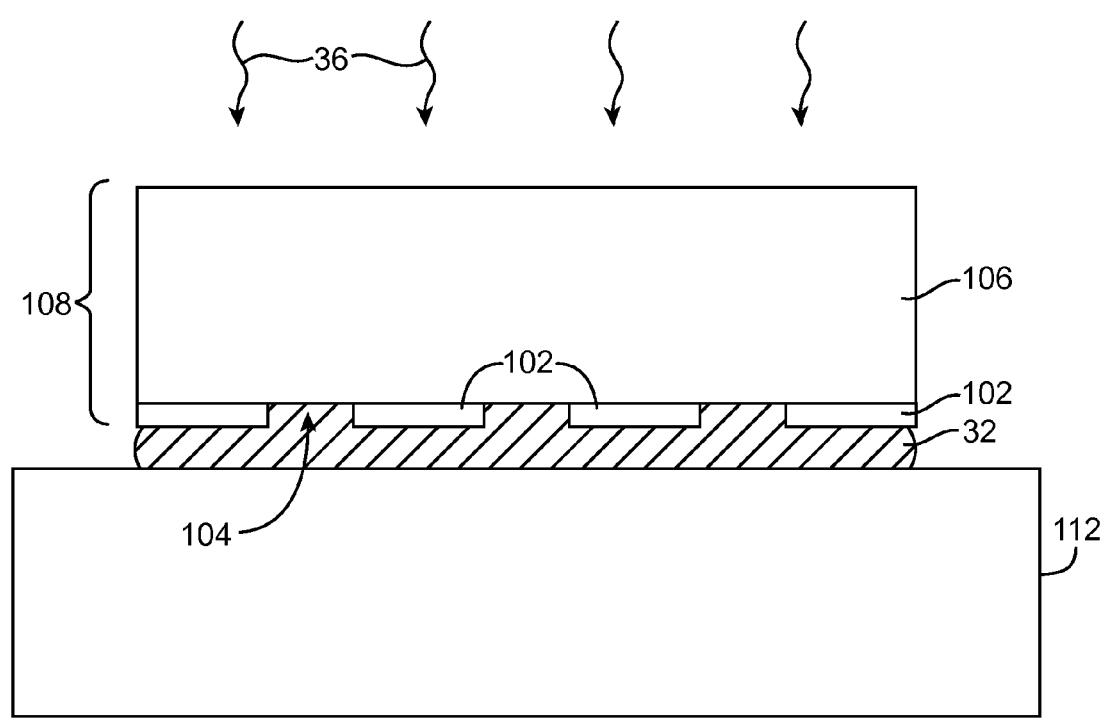
FIG. 14 is a cross-sectional side view of a structure with a patterned coating layer showing how UV/Vis radiation for curing adhesive may pass through openings in the patterned coating layer in accordance with an embodiment.

FIG. 14 shows how openings such as openings 104 in patterned layer 102 may be formed on an interior surface of plastic structure 106 of structure 108. As shown in FIG. 14, structure 106 may be mounted on structure 112 using adhesive 32. Adhesive 32 may initially be provided in liquid form. When light source 34 applies ultraviolet light 36 to structure 106, UV light 36 may pass through ultraviolet-light-transparent structure 106 and holes 104 in coating 102 to illuminate and cure adhesive 32. When adhesive 32 is cured in this way, structures 106 and 112 may be bonded to each other.

Structure 112 may be, for example, a housing structure, an electronic component, or other structure in device 10 and may be formed from plastic, metal, glass, ceramic, other materials, or combinations of these materials. Structure 106 may be a display cover layer (e.g., a clear glass or plastic layer that serves as a cover for a liquid crystal display module or other display structure), may be a housing structure, may be a part of a component such as an electrical component, or may be other suitable electronic device structure in device 10.

Figure 15:
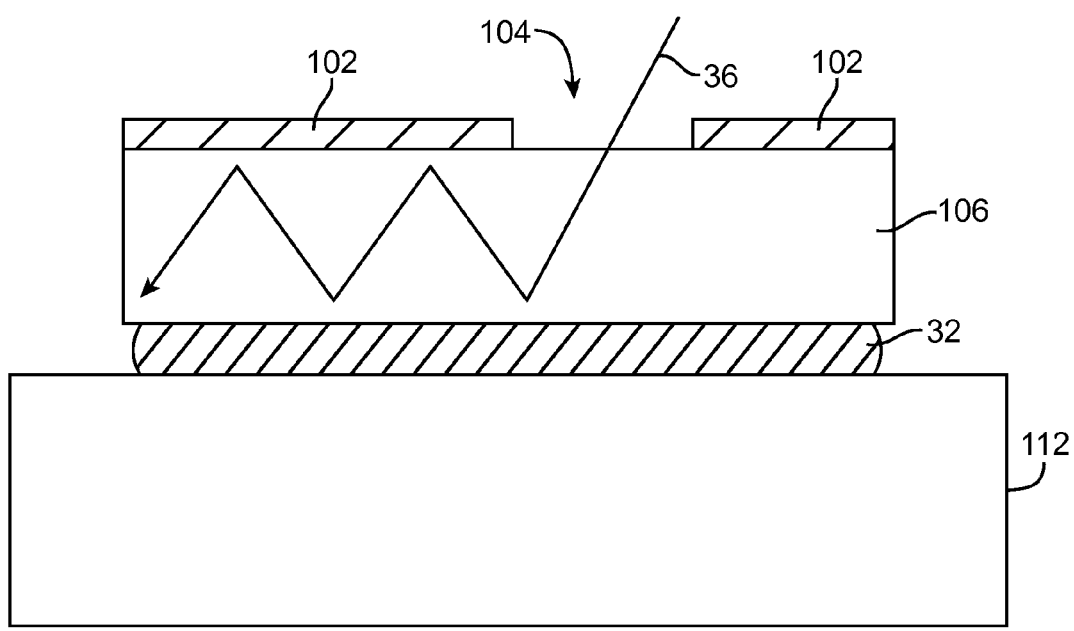
FIG. 15 is a cross-sectional side view of an illustrative structure having a patterned coating with an opening that allows ultraviolet radiation to enter the structure to cure adhesive in accordance with an embodiment.

Another illustrative arrangement in which ultraviolet light 36 may be launched into ultraviolet-light transparent member 106 through opening 104 is shown in FIG. 15. In an arrangement of the type shown in FIG. 15, partial coating layer 102 (e.g., an opaque coating layer) may be placed on the upper surface of ultraviolet transparent structure 106 to help hide structure 106 from view (as an example). UV radiation 36 may be generated using an ultraviolet light source (e.g., source 34) such as an ultraviolet laser, an ultraviolet light-emitting diode, or an ultraviolet lamp. UV radiation 36 may scatter from the underside of layer 102 while propagating along the interior of structure 106 and illuminate UV/Vis adhesive 32. When adhesive 32 is cured by UV radiation 36, structure 106 will be attached to structure 112.

Figure 16:
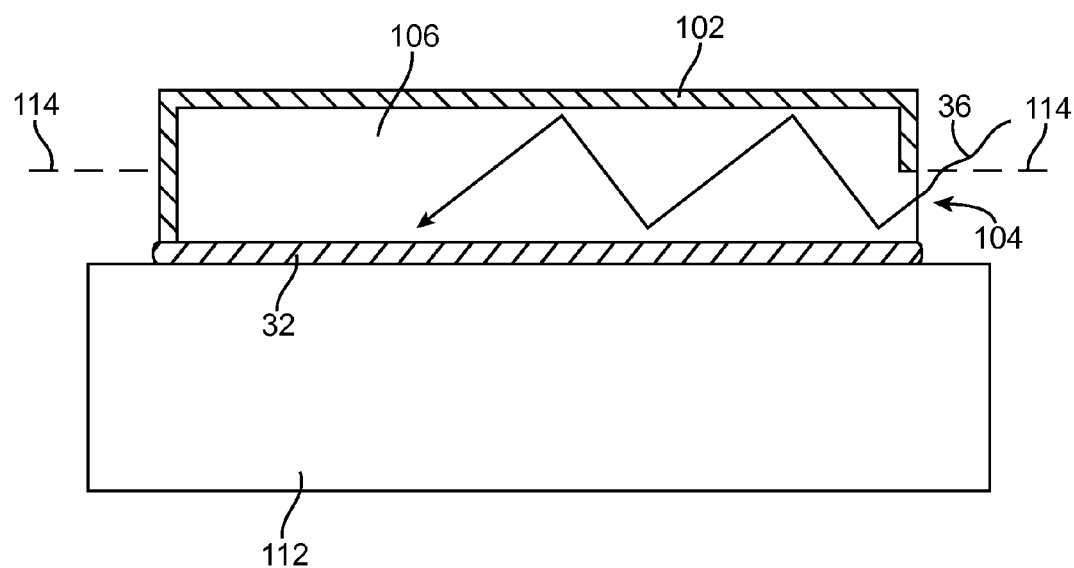
FIG. 16 is a cross-sectional side view of a structure having a coating that forms an opening on an end of the structure that allows ultraviolet radiation to enter the structure to cure adhesive in accordance with an embodiment.

With the illustrative approach of FIG. 16, opening 104 in partial coating 102 on ultraviolet-light-transparent structure 106 has been formed on an end face of structure 106. Light source 34 (FIG. 8) may launch UV light 36 into structure 106 via one or more side wall openings such as opening 104 of FIG. 16, thereby causing UV radiation 36 to propagate along longitudinal axis 114 of structure 106 while exiting the coating opening formed on the lower surface of structure 106 to illuminate and cure adhesive 32.

Figure 17:
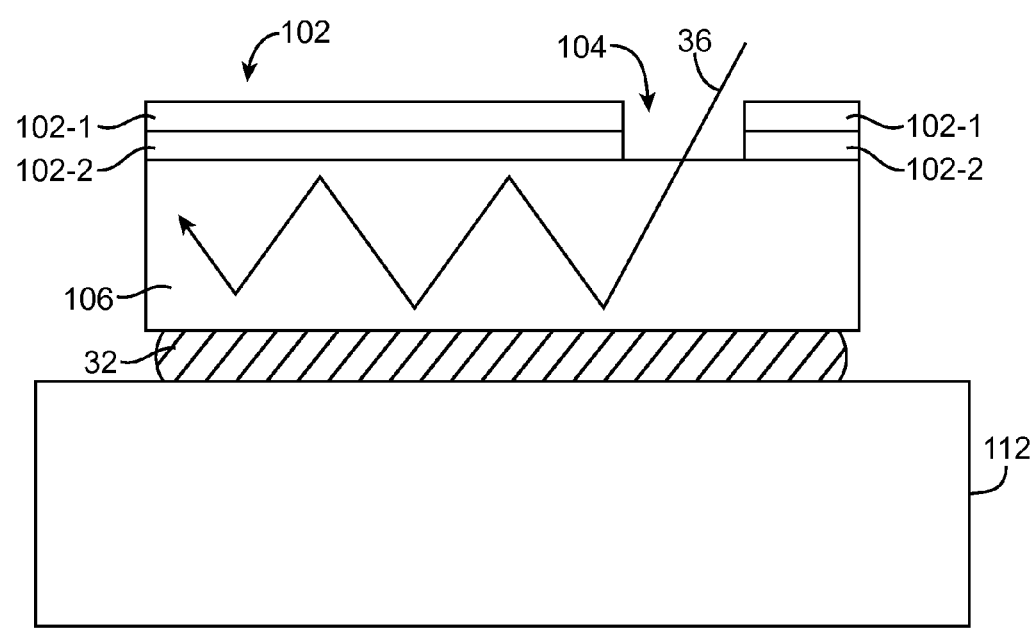
FIG. 17 is a cross-sectional side view of a structure having a coating with an opening that receives ultraviolet radiation to cure adhesive and that has a reflective coating to enhance ultraviolet radiation reflections within the structure in accordance with an embodiment.

As shown in FIG. 17, coatings on the surface of ultraviolet-light-transparent structure 106 such as coating 102 may be formed from two or more layers of material such as outer coating layer 102-1 and inner coating layer 102-2. Coating layer 102-2 may be, for example, a metal layer formed from a metallic paint coating or other metal coating. The presence of a metal inner coating on structure 106 may help reduce leakage of ultraviolet light from structure 106 as UV light 36 scatters along the length of structure 106 and illuminates adhesive 32. Coating layer 102-1 may be formed from a layer of black ink or other opaque material (e.g., to reduce external reflections from coating 102-2.

Figure 18:
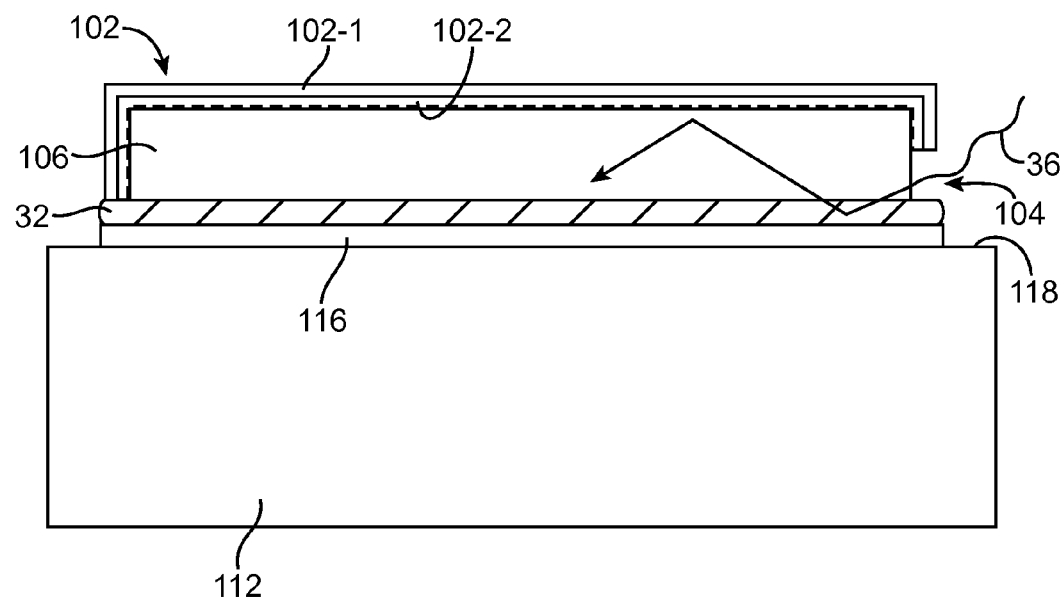
FIG. 18 is a cross-sectional side view of a structure formed over a lower reflective coating and having an upper reflective coating for reflecting ultraviolet radiation within the structures to cure UV/Vis adhesive in accordance with an embodiment.

As shown by illustrative coating layer 116 of FIG. 18, a coating such as coating 116 may be provided underneath ultraviolet-light-transparent structure 106 on upper surface 118 of structure 112. Coating 116 may be formed from a single layer of material (e.g., an opaque polymer layer or a metal layer) or may be formed from multiple layers (e.g., an outer opaque layer such as layer 102-1 and an inner reflective metal layer such as layer 102-2). The use of layer 116 may help enhance the reflection of UV radiation 36 along the length of structure 106 and may therefore help increase the illumination of UV/Vis adhesive 32 by UV light 36 during curing operations.

Figure 19:
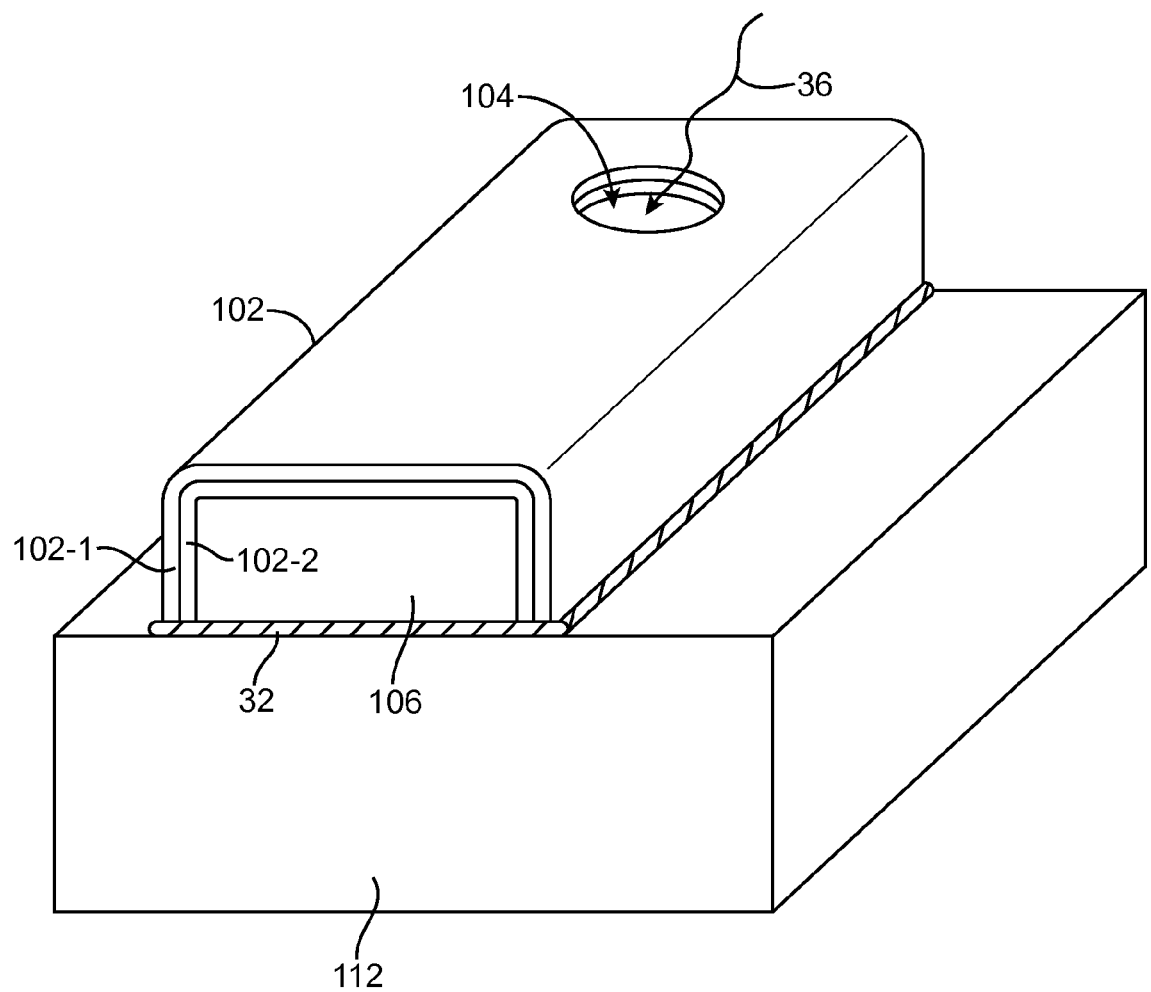
FIG. 19 is a perspective view of a structure that has been coated with a reflective coating and an opaque coating having openings to allow ultraviolet radiation to enter the structure and cure adhesive in accordance with an embodiment.

FIG. 19 is a perspective view of an illustrative configuration that may be used for ultraviolet-light-transparent structure 106 showing how UV radiation 36 may be launched into structure 106 through opening 104 in a portion of coating 102 on the upper surface of structure 106. Once UV radiation 36 has been coupled into structure 106 through opening 104, inner coating 102-2 may help reflect and guide UV radiation 36 along the length of structure 106, thereby illuminating adhesive 32. The process of illuminating adhesive 32 with UV light 36 may cure adhesive 32 to attach structure 106 to structure 112.

Figure 20:
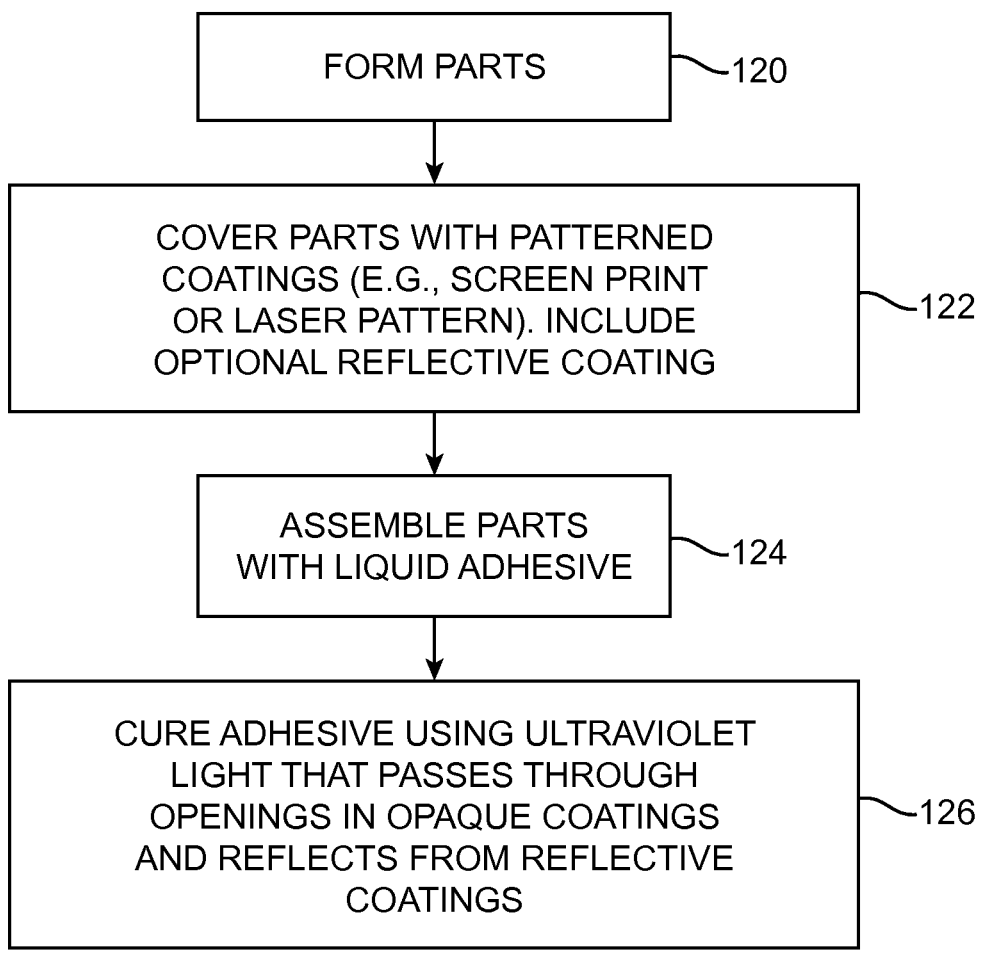
FIG. 20 is a flow chart of illustrative steps involved in forming parts that include patterned coatings having openings through which ultraviolet radiation may pass to cure UV/Vis adhesive in accordance with an embodiment.

FIG. 20 is a flow chart of illustrative steps involved in forming structures such as ultraviolet-light-transparent structures 106 with coatings.

At step 120, injection molding tools, machining equipment, and other equipment may be used in forming structures such as ultraviolet-light-transparent structure 106 and structure 112.

At step 122, structures such as structure 106 may be partly covered with one or more layers of patterned coatings. For example, coating materials may be deposited and subsequently patterned using laser-based patterning system 94 of FIG. 12 or other patterning equipment or coating materials may be deposited and patterned at the same time using screen printing, ink-jet printing, or other patterned coating techniques of the type described in connection with FIG. 13. Coatings may include one or more layers of material such as metal layers, polymer layers (e.g., polymer-based ink layers), etc. The coatings that are formed in this way may have one or more openings 104. Openings 104 may be relatively large to accommodate introduction of relatively large beams of ultraviolet light or may be relatively small perforation (e.g., microperf) suitable for use on an exposed (cosmetic) surface in device 10. An uncoated region may also be formed along the portions of structure 106 that will lie adjacent to adhesive 32.

At step 124, the structures that have been formed such as coated structure 106 and structure 112 may be assembled using a liquid form of adhesive 32. Adhesive 32 may be deposited from a nozzle, by spraying, by dipping, or using other application techniques.

At step 126, a light source such as light source 34 may be used to generate UV radiation 36. UV radiation 36 may be launched into ultraviolet-light-transparent structures 106 through openings 104. Inside structures 106, ultraviolet radiation 36 may reflect off of coatings 102 (e.g., metal coatings) and may illuminate adhesive 32. By illuminating adhesive 32 in this way, adhesive 32 may be cured to attach structures 106 and 112 to each other.

The foregoing is merely illustrative and various modifications can be made by those skilled in the art without departing from the scope and spirit of the described embodiments. The foregoing embodiments may be implemented individually or in any combination.

What is claimed is:

1. A method, comprising:
    forming a two-shot plastic structure using first and second shots of plastic in injection molding equipment, wherein the first shot of plastic comprises ultraviolet-light-transparent plastic;
    applying adhesive between the two-shot plastic structure and an additional structure, wherein the adhesive is configured to be cured by exposure to at least ultraviolet light; and
    applying ultraviolet light to the adhesive through the ultraviolet-light-transparent plastic in the two-shot plastic structure to cure the adhesive.

2. The method defined in claim 1 wherein the second shot of plastic comprises plastic that is opaque to ultraviolet light.

3. The method defined in claim 2 wherein the additional structure comprises a camera window and wherein applying the ultraviolet light comprises applying the ultraviolet light to the adhesive to attach the camera window to the two-shot plastic structure.

4. The method defined in claim 1 wherein forming the two-shot plastic structure comprises:
    injection molding the ultraviolet-light-transparent plastic; and
    injection molding plastic that is opaque at visible light wavelengths over the ultraviolet-light-transparent plastic.

5. An apparatus, comprising:
    a plastic structure having first and second plastic portions, wherein the first plastic portion comprises ultraviolet-light-transparent plastic and wherein the second plastic portion comprises plastic that is opaque at visible light wavelengths;
    a structure associated with an electronic device; and
    adhesive that attaches the plastic structure to the structure associated with the electronic device, wherein the adhesive has been cured with at least ultraviolet light.

6. The apparatus defined in claim 5 wherein the plastic structure comprises a two-shot injection molded plastic structure.

7. The apparatus defined in claim 6 wherein the structure associated with the electronic device comprises a clear structure having a layer of opaque masking material.

8. A method for attaching structures for an electronic device, comprising:
    applying adhesive between first and second structures, wherein the first structure comprises plastic that is transparent to ultraviolet light and opaque to visible light and wherein the adhesive is configured to be cured by exposure to ultraviolet light; and
    curing the adhesive by applying ultraviolet light to the adhesive through the first structure.

9. The method defined in claim 8 wherein the second structure comprises a plastic structure and wherein curing the adhesive comprises attaching the first structure to the plastic structure.

10. The method defined in claim 8 wherein the plastic of the first structure exhibits more than 70% transmission of ultraviolet light and wherein curing the adhesive comprises transmitting ultraviolet light through the plastic that exhibits more than 70% transmission of ultraviolet light.

11. The method defined in claim 10 wherein the plastic of the first structure exhibits less than 30% transmission of visible light and wherein curing the adhesive comprises transmitting ultraviolet light through the plastic that exhibits less than 30% transmission of visible light.

12. An apparatus, comprising:
    a first electronic device structure that is transparent to ultraviolet light and opaque to visible light;
    a second electronic device structure; and
    a layer of adhesive interposed between the first electronic device structure and the second electronic device structure, wherein the adhesive has been cured by exposure to at least ultraviolet light.

13. The apparatus defined in claim 12 wherein the first electronic device structure comprises plastic.

14. The apparatus defined in claim 13 wherein the plastic of the first electronic device structure exhibits more than 70% transmission of ultraviolet light.

15. The apparatus defined in claim 13 wherein the plastic of the first electronic device structure exhibits less than 30% transmission of visible light.

16. The apparatus defined in claim 13, wherein the second electronic device structure comprises plastic.

17. The apparatus defined in claim 16, wherein the second electronic device structure comprises injection-molded plastic.

18. The apparatus defined in claim 12 wherein the first electronic device structure comprises injection-molded plastic.

19. The apparatus defined in claim 12, further comprising a coating that at least partly covers the first electronic device structure.

20. The apparatus defined in claim 19, wherein the coating comprises an opaque coating.

21. The apparatus defined in claim 20, wherein the opaque coating comprises a metal layer.

22. The apparatus defined in claim 20, wherein the coating includes a plurality of holes configured to pass light to the layer of adhesive.

* * * * *